United States Patent
Yu et al.

(10) Patent No.: US 9,135,431 B2
(45) Date of Patent: Sep. 15, 2015

(54) HARMONIC DETECTOR OF CRITICAL PATH MONITORS

(71) Applicant: Apple Inc., Cupertino, CA (US)

(72) Inventors: Shu-Yi Yu, Sunnyvale, CA (US);
Timothy R. Paaske, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 251 days.

(21) Appl. No.: 13/951,763

(22) Filed: Jul. 26, 2013

(65) Prior Publication Data

US 2015/0033061 A1    Jan. 29, 2015

(51) Int. Cl.
*G06F 1/12* (2006.01)
*G06F 21/50* (2013.01)
*G06F 1/08* (2006.01)
*G06F 21/55* (2013.01)

(52) U.S. Cl.
CPC *G06F 21/50* (2013.01); *G06F 1/08* (2013.01); *G06F 21/558* (2013.01)

(58) Field of Classification Search
CPC .................................. G06F 21/50; G06F 1/08
USPC ......................................................... 713/320
See application file for complete search history.

(56) References Cited

U.S. PATENT DOCUMENTS

| | | | |
|---|---|---|---|
| 6,259,279 B1 * | 7/2001 | Galbraith et al. | 327/49 |
| 7,080,001 B2 | 7/2006 | Moriyama et al. | |
| 7,472,305 B1 * | 12/2008 | Hershman et al. | 713/500 |
| 7,671,654 B2 | 3/2010 | Rozen et al. | |
| 8,350,589 B2 | 1/2013 | Chlipala et al. | |
| 8,378,710 B1 | 2/2013 | Al-Kadi et al. | |
| 2010/0079600 A1 * | 4/2010 | Silverbrook | 348/207.2 |

* cited by examiner

*Primary Examiner* — Vincent Tran
(74) *Attorney, Agent, or Firm* — Meyertons, Hood, Kivlin, Kowert & Goetzel, P.C.

(57) ABSTRACT

A system for monitoring a clock input signal including a reference clock to be monitored, a flip-flop, a plurality of delay logic blocks, a sampling unit, and a comparison unit. The reference clock may have an expected maximum frequency. The flip-flop may be configured to generate a corresponding clock signal at a reduced frequency compared to the reference clock. The plurality of delay logic blocks may be configured to receive the reduced frequency clock signal and delay the signal for various amounts of time, each less than an expected period of the reference clock. The sampling unit may be configured to sample the signals output from the plurality of delay logic blocks. The comparison unit may be configured to receive the outputs of the flip-flop and the sampling unit and use these outputs to determine if the reference clock is running at an acceptable frequency compared to the expected frequency.

20 Claims, 8 Drawing Sheets

HARMONIC DETECTOR OF CRITICAL PATH MONITORS

BACKGROUND

1. Technical Field

This invention is related to the field of integrated circuit implementation, and more particularly to the implementation of clock signal monitoring circuits.

2. Description of the Related Art

Computing systems may include one or more systems-on-a-chip (SoCs), which may integrate a number of different functions, such as, graphics and audio processing, onto a single integrated circuit. With numerous functions included in a single integrated circuit, chip count may be kept low in mobile computing systems, such as smartphones and tablets, for example, which may result in reduced assembly costs, and a smaller form factor for such mobile computing systems.

Many of the functional blocks of an SoC may require a clock source to function, to communicate with other blocks in the SoC, and/or to communicate with other chips in the system. SoCs may have one or more clock inputs to receive a clock signal from elsewhere in the system to be used as a clock source inside the SoC. SoCs may include a crystal oscillator circuit that requires a crystal to be coupled to the SoC to generate a clock signal within the SoC. Some SoCs may have phase-locked-loop circuits (PLLs) or frequency-locked-loop circuits (FLLs) internally that may take the clock input from the system or from the crystal oscillator and multiply and/or divide the input to generate a clock signal with a given frequency to best match the needs of the application. In some embodiments, an SoC may generate a clock signal internally, which may be used directly or used as the input to an FLL or PLL.

Some system-on-a-chip (SoC) designs may be used in applications which may be targeted by a subset of users who attempt to gain unauthorized access into the system (commonly referred to as "hacking a system" or "hacking"). Some typical applications targeted for hacking include mobile phones, tablet computers, and video game systems.

A common method used to attack systems is to overdrive the clock input into one of the processing chips in the system. The intent is to force the chip into a logic error which may result in the chip entering a state from which the attacker may gain control over the execution of the processor. Once the attacker has whole or partial control of the chip, the attacker may be able to access information within the system, such as, e.g., security keys for accessing a cellular network, encryption key for data stored in the system, and the like.

A clock signal monitoring circuit may be used within a system for the purpose of detecting if the frequency of a clock signal is operating at a frequency higher than for which the system is designed. A clock signal monitoring circuit may sample an input clock signal to determine if the input clock is running above or below a predetermined frequency. Several embodiments of a clock signal monitoring circuit will be discussed below.

SUMMARY OF THE EMBODIMENTS

Various embodiments of a clock monitoring system are disclosed. Broadly speaking, a system, an apparatus, and a method are contemplated in which the system includes a processor, a memory coupled to the processor, and a reference clock circuit coupled to the processor and configured to generate a reference clock signal with an expected maximum frequency. The system may also include a clock monitor circuit coupled to the processor and to the reference clock circuit. The clock monitor circuit may be configured to receive the reference clock signal and divide the reference clock signal, creating a derived clock signal that is lower frequency than the reference clock signal. The clock monitor circuit may also be configured to delay the derived clock signal, creating several delayed clock signals and then sample the derived clock signal and each delayed clock signal on an active edge of the reference clock signal. The clock monitor circuit may be further configured to compare the sample of the derived clock signal to each sample of the delayed clock signals and determine if the frequency of the reference clock signal is greater than the expected maximum frequency. If the frequency is determined to be greater than the expected maximum frequency, then the clock monitor circuit may assert an alert signal.

In another embodiment, the clock monitor circuit may be further configured to delay an initial one of the delayed clock signals by an amount of time approximately equal to the period of the expected maximum frequency.

In a further embodiment, the clock monitor circuit may be configured to delay remaining delayed clock signals by an amount of time greater than the period of an even harmonic of the expected maximum frequency and less than one-half of the period of the next larger odd harmonic of the expected maximum frequency.

Other embodiments may include a clock monitor circuit further configured to reset the system in response to determining the actual frequency of the reference clock signal is greater than the expected maximum frequency.

Alternate embodiments may include a clock monitor circuit further configured to reduce the frequency of the reference clock signal in response to the determination the actual frequency of the reference clock signal is greater than the expected maximum frequency.

BRIEF DESCRIPTION OF THE DRAWINGS

The following detailed description makes reference to the accompanying drawings, which are now briefly described.

Figure 1:
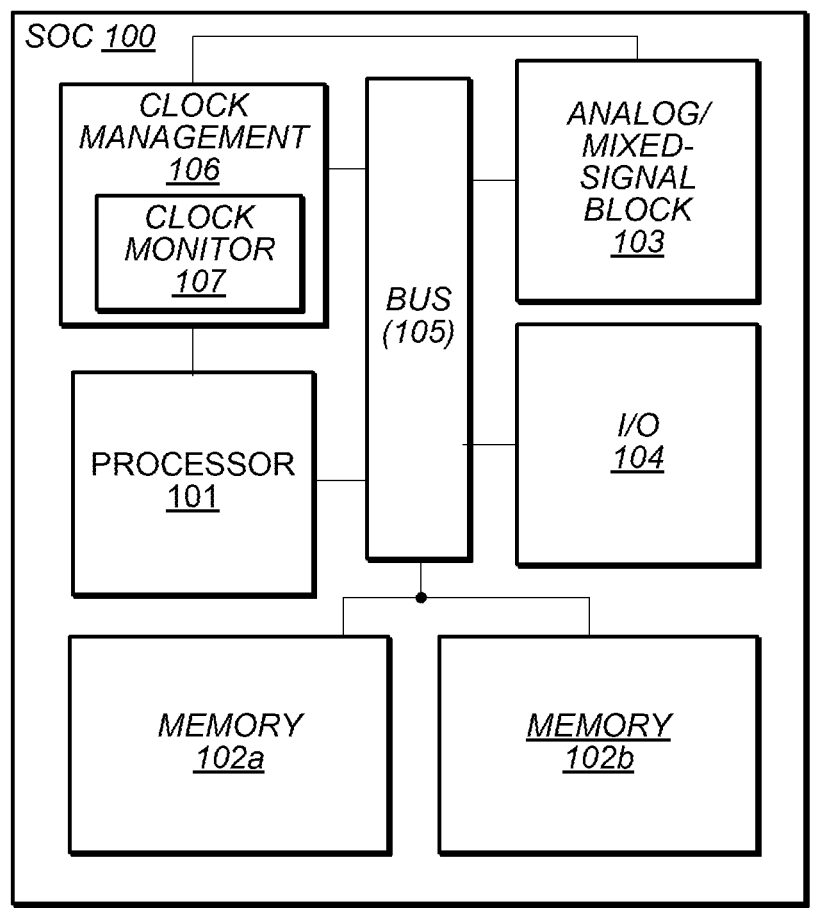
FIG. 1 illustrates an embodiment of a system.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component. More generally, the recitation of any element is expressly intended not to invoke 35 U.S.C. §112, paragraph six interpretation for that element unless the language "means for" or "step for" is specifically recited.

DETAILED DESCRIPTION OF EMBODIMENTS

A system on a chip (SoC) may include one or more functional blocks, such as, e.g., a processor, which may integrate the function of a computing system onto a single integrated circuit. Since an SoC may integrate multiple features into a single circuit, they are a popular choice for portable devices where space for components is limited.

SoCs may have one or more clock sources to be used by the various functional blocks within the SoC. In some embodiments, SoCs may include a crystal oscillator circuit. Some embodiments may also have one or more PLLs and/or FLLs for generating various clock signals. In some embodiments, an SoC may generate a clock signal internally, which may be used directly or used as the input to an FLL or PLL.

A "clock attack" is a common method used to attempt to hack into systems with the goal of the attack to get the chip to enter a state from which the attacker may gain full or partial control over the execution of the processor. A clock attack may involve overdriving the clock input into one of the processing chips in the system which may force the chip into a logic error. To help defend from clock attacks, some SoCs may include a clock monitoring circuit. A clock monitoring circuit, or clock monitor, is a means for determining if a clock signal is running at a frequency above or below a designated frequency.

Various embodiments of a clock monitoring circuit are described in this disclosure. Some clock monitor embodiments may be limited to a certain range of frequencies they are capable of detecting. The embodiments illustrated in the drawings and described below may provide techniques for monitoring clock signals within a computing system over a wider range of frequencies.

System-on-a-Chip Overview

A block diagram of an SoC is illustrated in FIG. 1. In the illustrated embodiment, the SoC 100 includes a processor 101 coupled to memory blocks 102a and 102b, an analog/mixed-signal block 103, an I/O block 104, and a clock management unit 106, through a bus 105. Processor 101 is also coupled directly to a clock management unit 106. In various embodiments, SoC 100 may be configured for use in a mobile computing application such as, e.g., a tablet computer or cellular telephone.

Processor 101 may, in various embodiments, be representative of a general-purpose processor that performs computational operations. For example, processor 101 may be a central processing unit (CPU) such as a microprocessor, a microcontroller, an application-specific integrated circuit (ASIC), or a field-programmable gate array (FPGA). In some embodiments, processor 101 may include multiple CPU cores. In some embodiments, processor 101 may include one or more register files and memories.

In some embodiments, processor 101 may implement any suitable instruction set architecture (ISA), such as, e.g., PowerPC™, or x86 ISAs, or combination thereof. Processor 101 may include one or more bus transceiver units that allow processor 101 to communication to other functional blocks within SoC 100 such as, memory blocks 102a and 102b, for example.

Memory 102a and memory 102b may include any suitable type of memory such as, for example, a Dynamic Random Access Memory (DRAM), a Static Random Access Memory (SRAM), a Read-only Memory (ROM), Electrically Erasable Programmable Read-only Memory (EEPROM), a FLASH memory, a Ferroelectric Random Access Memory (FeRAM), or a Magnetoresistive Random Access Memory (MRAM), for example. Some embodiments may include single memory, such as memory 102a and other embodiments may include more than two memory blocks (not shown). Memory 102a and memory 102b may be multiple instantiations of the same type of memory or may be a mix of different types of memory. In some embodiments, memory 102a and memory 102b may be configured to store program code or program instructions that may be executed by processor 101. Memory 102a and memory 102b may, in other embodiments, be configured to store data to be processed, such as graphics data, for example.

Analog/mixed-signal block 103 may include a variety of circuits including, for example one or more voltage regulators, an analog-to-digital converter (ADC), and a digital-to-analog converter (DAC) (all not shown). In some embodiments, analog/mixed-signal block 103 may also include a crystal oscillator, a phase-locked loop (PLL), a frequency-locked loop (FLL), and/or an internal oscillator.

I/O block 104 may be configured to coordinate data transfer between SoC 100 and one or more peripheral devices. Such peripheral devices may include, without limitation, storage devices (e.g., magnetic or optical media-based storage devices including hard drives, tape drives, CD drives, DVD drives, etc.), audio processing subsystems, graphics processing subsystems, or any other suitable type of peripheral devices. In some embodiments, I/O block 104 may be configured to implement a version of Universal Serial Bus (USB) protocol, IEEE 1394 (Firewire®) protocol, or, and may allow for program code and/or program instructions to be transferred from a peripheral storage device for execution by processor 101.

Communications link (BUS) 105 may be configured as one or more buses to couple processor 101 to the other functional blocks within the SoC 100 such as, e.g., memory 102a, and I/O block 104. In some embodiments, communications link 105 may include interfaces coupled to one or more of the functional blocks that allow a particular functional block to communicate through the link. In some embodiments, communications link 105 may allow movement of data and transactions between functional blocks without intervention from processor 101. For example, data received through the I/O block 104 may be stored directly to memory 102a.

Clock management unit 106 may be configured to manage clock distribution to some or all of the functional blocks included in SoC 100. In some embodiments, some or all of the clock signals in the SoC may be managed by clock management unit 106. In some embodiments, clock management unit 106 may include sub-blocks for managing multiple clock sources for various functional blocks. Clock management unit 106 may include clock monitor 107, which will be described below in more detail.

It is noted that the SoC illustrated in FIG. 1 is merely an example. In other embodiments, different functional blocks and different configurations of functions blocks may be possible dependent upon the specific application for which the SoC is intended. It is further noted that the various functional blocks illustrated in SoC 100 may operate at different clock frequencies, and may require different power supply voltages.

Clock Monitoring System Overview

Figure 2:
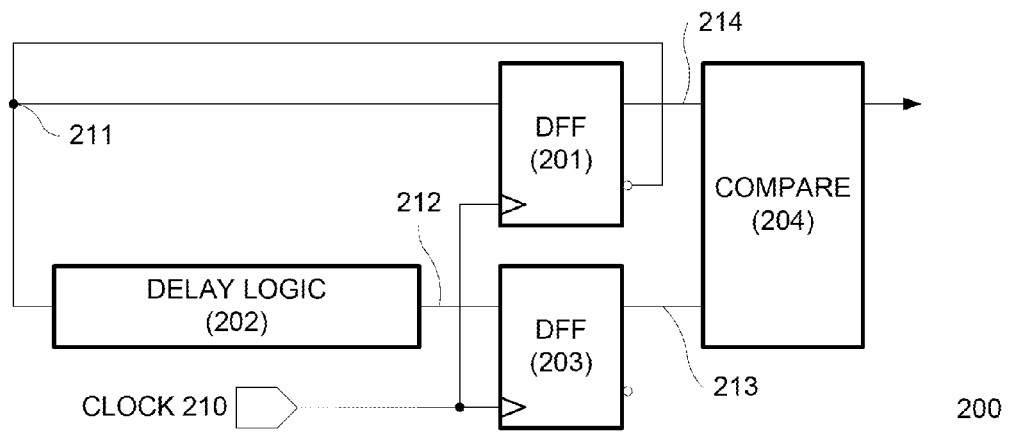
FIG. 2 illustrates a block diagram of an embodiment of a clock monitoring system.

FIG. 2 shows a block diagram of a possible embodiment for a clock monitor 200. Clock monitor 200 may include D-type flip-flop (DFF) 201, delay logic 202, DFF 203 and compare logic 204. Clock monitor 200 may be used to detect if the clock signal to be monitored, CLOCK 210, is operating at a frequency above or a frequency below an expected frequency.

DFF 201 may be coupled to CLOCK 210 and may be used to generate derived clock 211 running at one-half the frequency of CLOCK 210. By generating a slower clock signal based on CLOCK 210, CLOCK 210 may be used as the clock source for the DFFs. DFF 201 may divide CLOCK 210 by receiving an inverted value of the DFF 201 output. Receiving CLOCK 210 as the DFF 201 clock input may cause the output of DFF 201 to toggle in response to each active edge of CLOCK 210, where the active edge may refer to a rising or falling edge, depending on the type of flip-flop used. The non-inverted output of DFF 201 may be used as sampled derived clock 214, a sample of derived clock 211 taken at the active edge of CLOCK 210.

In some embodiments, DFF 201 may be implemented as a flip-flop. It is noted that flip-flops as described herein may be particular embodiments of single data bit storage circuit and may be designed in accordance with one of various design styles. For example, latches and flip-flops may be implemented using either dynamic or static circuits, or a combination thereof. In some embodiments, each storage circuit may include scan cells as part of the implementation of a boundary scan test circuit. In various embodiments, flip-flops, latches and other single data bit storage circuits may output, in addition to the value of a stored data bit, a second value corresponding to an inverted value of the stored data bit.

Delay logic 202 may receive derived clock 211 at its input and create delayed clock 212, a signal with similar characteristics as derived clock 211, but shifted in time. For example, delay logic 202 may be configured to delay the input by 3 nanoseconds (nsec) to the output. In this example, suppose derived clock 211 is input into delay logic 202 with a rising edge at 0 nsec and a falling edge at 5 nsec. The output of delay logic 202 may produce a delayed clock 212 having a rising edge at 3 nsec and a falling edge at 8 nsec. Note that these example delay times are used solely to demonstrate how a clock signal is delayed and are not intended to imply typical values.

Many circuits may be used to delay an input signal. Various embodiments of delay logic 202 may include inverter chains, current-starved inverters, resistor-capacitor (RC) networks and combinations thereof. In some embodiments, for example, delay logic 202 may be a chain of current-starved inverters.

The output of delay logic 202, in some embodiments, may be an input into DFF 203. DFF 203 may sample and store the output of delay logic 202 in response to every active edge of CLOCK 210, creating sampled delayed clock 213. DFF 203 may retain the value of sampled delayed clock 213 until a subsequent active edge of CLOCK 210 which may update the value of sampled delayed clock 213.

Compare 204 may receive sampled derived clock 214 and sampled delayed clock 213. Compare 204 may compare sampled derived clock 214 and sampled delayed clock 213, and based on the comparison, may determine if the frequency of CLOCK 210 is greater than or less than the expected frequency.

The embodiment illustrated in FIG. 2 is merely one embodiment of a clock monitor circuit. In other embodiments, different numbers of flip-flops and different delay logic circuits may be employed.

Figure 3:
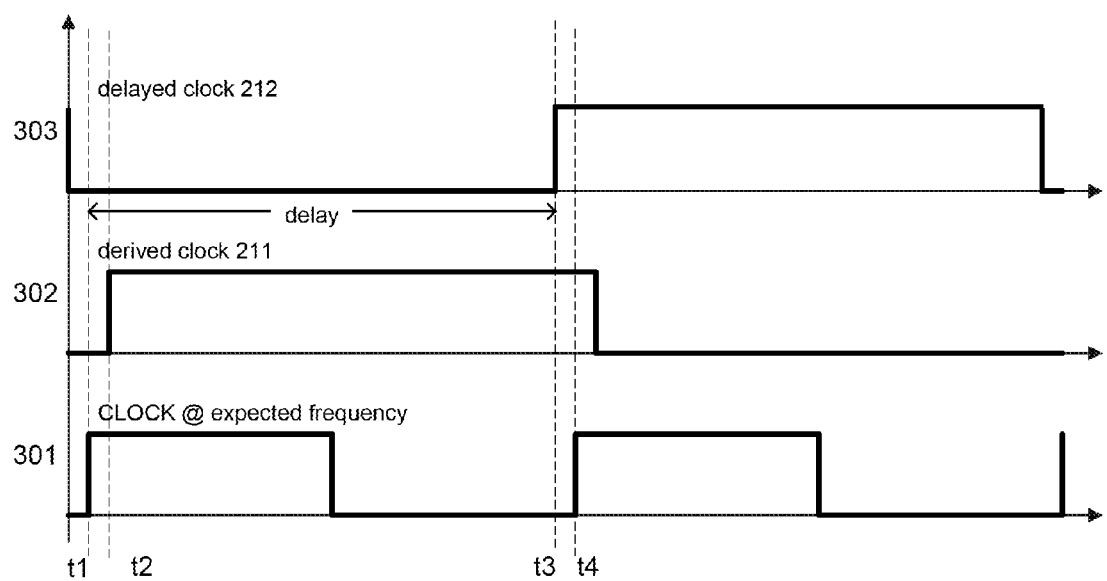
FIG. 3 illustrates possible waveforms corresponding to an embodiment of a clock monitoring system operating with an expected clock source.

Turning to FIG. 3, example waveforms that may correspond to the embodiment of FIG. 2 are illustrated. Referring collectively to the waveforms in FIG. 3 and the clock monitor circuit from FIG. 2, waveform 301 may represent CLOCK 210 running at an expected frequency, with rising edges at times t1 and t4. Waveform 302 may represent the derived clock output of DFF 201 and the input to delay logic 202. It is noted that there may be slight delay between the rising and falling edges of the derived clock and the rising edges of CLOCK 210, as shown, for example at time t2. Such delays may be due to propagation delays through logic gates. Waveform 303 may represent delayed clock 212 output from delay logic 202, where the delay in this example is slightly shorter than the period of CLOCK 210, as illustrated at time t3.

DFF 201 and DFF 203 may both be configured to be active on the rising edge of CLOCK 210, as highlighted in FIG. 3 at times t1 and t4. Other embodiments may have DFF 201 and DFF 203 active on falling edges of CLOCK 210. In this embodiment, we can see that derived clock 211 and delayed clock 212 have the same value at the two sample times, t1 and t4, which may indicate CLOCK 210 is running at an acceptable frequency. In other embodiments, delay logic 202 may be configured such that the derived clock and delayed clock have opposite values to indicate CLOCK 210 is running at an acceptable frequency.

It is noted that the waveforms illustrated in FIG. 3 are merely examples. In various embodiments, the waveforms may vary due to, for example, the specific circuits used, the technology the circuits are created in, and potential electromagnetic noise within the system.

Figure 4:
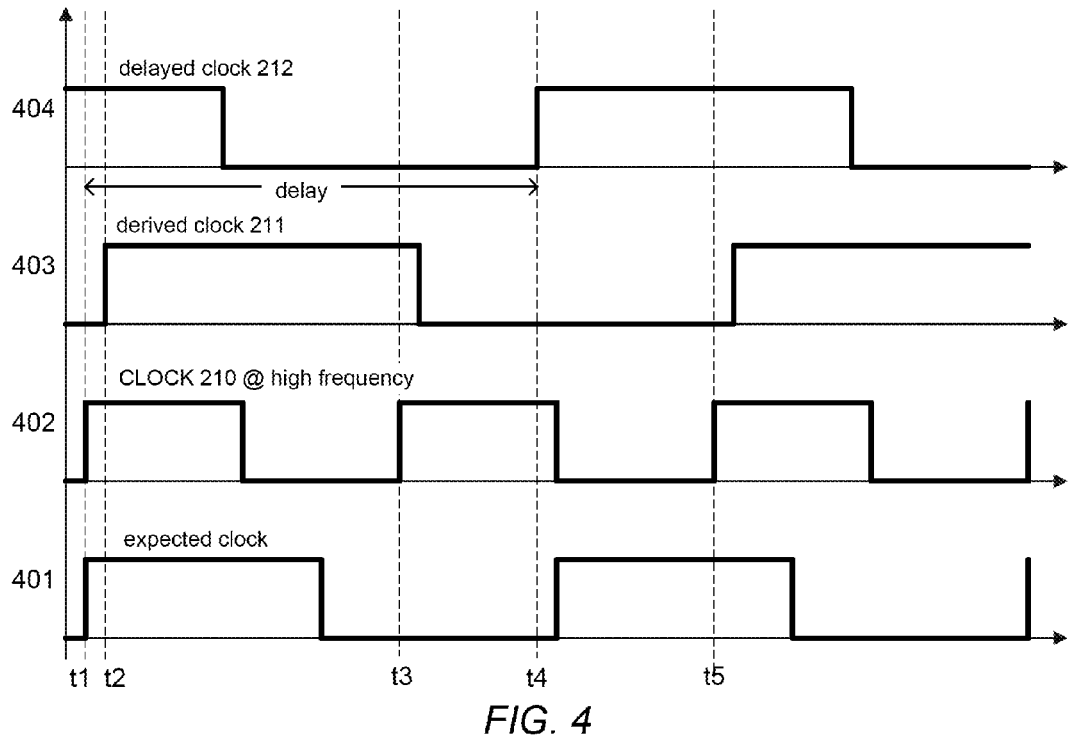
FIG. 4 illustrates possible waveforms corresponding to an embodiment of a clock monitoring system detecting an actual clock source with a frequency greater than expected.

Turning to FIG. 4, example waveforms are depicted which may illustrate the operation of a clock monitor circuit, such as, e.g., clock monitor 200 as illustrated in FIG. 2, when the frequency of an input clock exceeds an expected maximum frequency. Waveform 401 may show a clock signal running at the expected frequency for reference. Waveform 402 may show CLOCK 210 running at a frequency greater than the expected frequency, with rising edges at times t1, t3 and t5. Waveform 403 may show derived clock 211, running at one-half the frequency of CLOCK 210, with a slight delay from CLOCK 210 as shown at time t2. Delayed clock 212 may be shown by waveform 404, delayed for a time from t1 to t4.

In this example, since the delay may be based on the expected frequency, delayed clock 212 changes state after the rising edges of CLOCK 210. Therefore we see that delayed clock 212 and derived clock 211 may have opposite values when sampled at times t1, t3 and t5. These opposite values of delayed clock 212 and derived clock 211 may indicate a clock frequency that is running too fast in this embodiment. In response to detecting an unacceptable frequency for CLOCK 210, the system may set a flag or reset the system.

As previously noted, the waveforms illustrated in FIG. 4 are merely examples. Actual waveforms from an embodiment of FIG. 2 may vary due to, for example, the specific circuits used, the technology the circuits are created in, and potential electromagnetic noise within the system.

Figure 5:
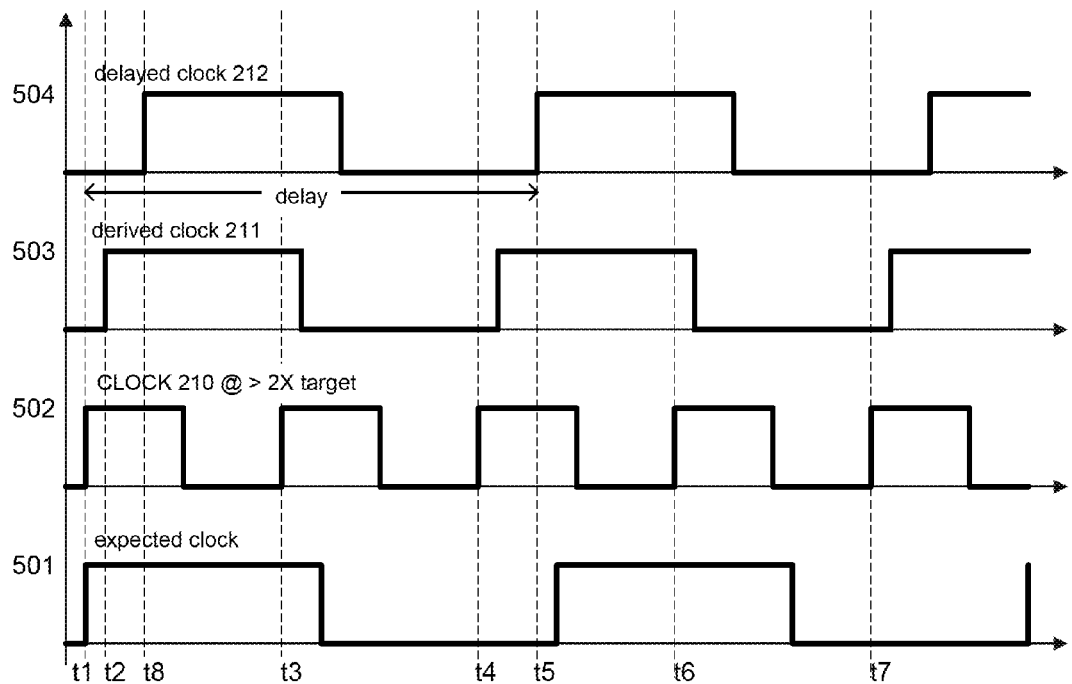
FIG. 5 illustrates possible waveforms corresponding to an embodiment of a clock monitoring system failing to detect an actual clock source with a frequency greater than expected.

The next example illustrates a case where the input clock may have a frequency greater than twice the expected frequency. FIG. 5 illustrates possible waveforms which may illustrate the operation of a clock monitor circuit, such as, e.g., clock monitor 200 as illustrated in FIG. 2, when the frequency of CLOCK 210 exceeds twice the expected frequency. Waveform 501 may again show a clock signal running at the expected frequency for reference. CLOCK 210 may be running at more than twice the expected frequency in waveform 502, with rising edges at times t1, t3, t4, t6, and t7. Waveform 503 may again represent derived clock 211, with slight delay from t1 to t2 possibly due to propagation delays. Waveform 504 may again show delayed clock 212, with a delay time from time t1 to time t5.

In this example, in which CLOCK 210 is greater than twice the expected frequency, notice that delayed clock 212 completes a full clock cycle within the delay time, between times t1 and t4. This results in delayed clock 212 appearing to be only slightly delayed from derived clock 211, as can be seen between times t2 and t8. At the sample times, t1, t3, t4, t6, and t7, we see that delayed clock 212 and derived clock 211 may have the same value. Since this example embodiment expects the samples of delayed clock and derived clock to be the same for an acceptable CLOCK 210 frequency, this CLOCK 210 frequency would be allowed even though it is running at twice the expected frequency. Clock monitor 200 is limited to detecting clock frequencies less than twice the expected frequency.

The waveforms illustrated in FIG. 5 are merely examples. Actual waveforms from an embodiment of FIG. 2 may vary due to, for example, the specific circuits used, the technology the circuits are created in, and potential electromagnetic noise within the system.

Figure 6:
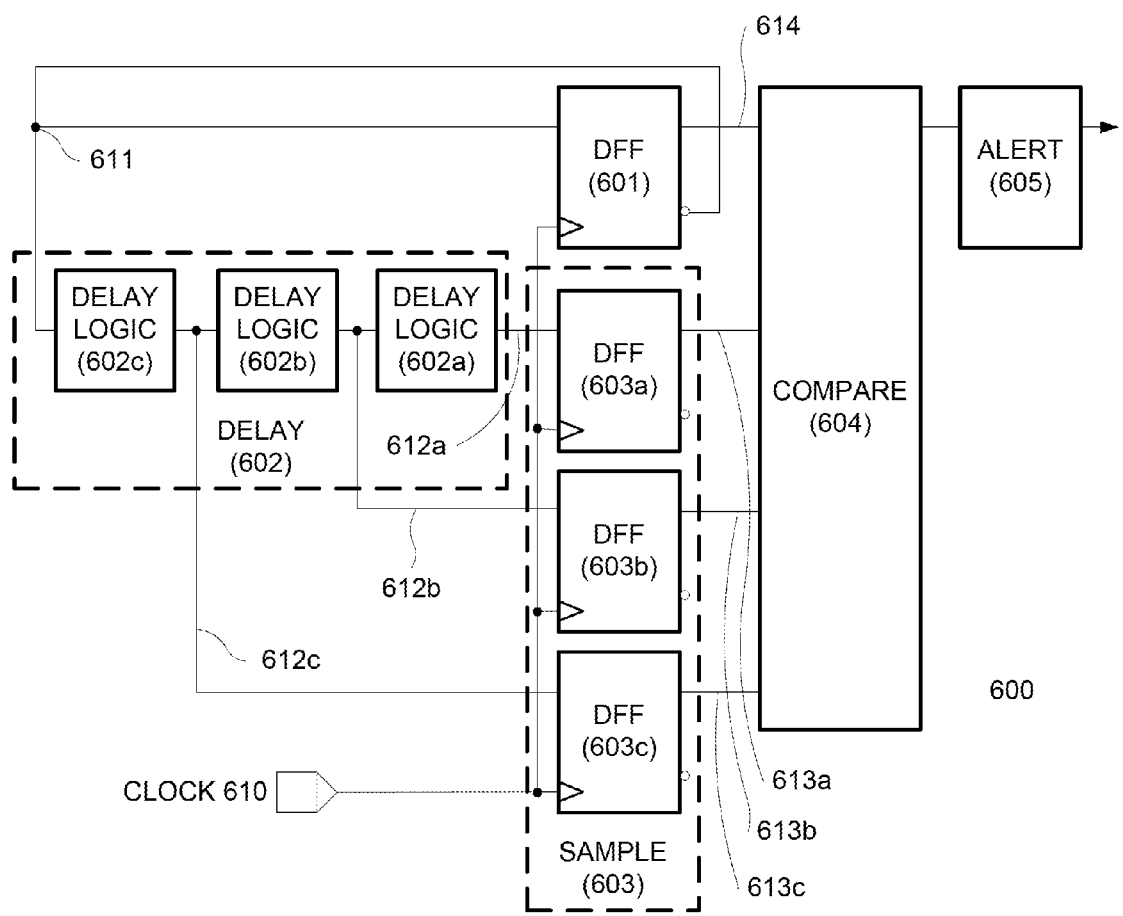
FIG. 6 illustrates a block diagram of another embodiment of a clock monitoring system.

Another embodiment of a clock monitor is depicted in FIG. 6. Clock monitor 600 may include DFF 601, delay logic block 602 coupled to DFF 601, a sampling unit 603 coupled to delay logic block 602, comparison unit 604 coupled to sampling unit 603 and DFF 601, and an alert signal 605 coupled to comparison unit 604.

A clock signal to be monitored, CLOCK 610, may be received by clock monitor 600. DFF 601 may generate a derived clock signal 611 from CLOCK 610, running at one-half the frequency of CLOCK 610. DFF 601 may divide CLOCK 610 by receiving an inverted value of the DFF 601 output. Receiving CLOCK 610 as the DFF 601 clock input may cause the output of DFF 601 to toggle in response to each active edge of CLOCK 610, wherein an active edge may be a rising or falling edge, depending on the type of circuit used. The non-inverted output of DFF 601 may be used as sampled derived clock 614, a sample of derived clock 611 taken at the rising edge of CLOCK 610.

Delay logic block 602 may receive derived clock signal 611 from DFF 601. In this example embodiment, delay logic block 602 may include three delay circuits, delay 602a, delay 602b, and delay 602c, configured to output three delayed clock signals, delayed clock signal 612a, delayed clock signal 612b, and delayed clock signal 612c, similar to derived clock signal 611. Each delay circuit 602a-602c may delay their output for different amounts of time, such that the three delayed clock signals output by delay logic block 602 may represent the derived clock with three distinct delay times. More details on selecting suitable delay times will be discussed below.

As previously stated, many circuits may be used to delay an input signal. Various embodiments of delay logic 602 may include inverter chains, current-starved inverters, RC networks and combinations thereof. In some embodiments, for example, delay logic 602 may be a chain of current-starved inverters with an RC network between each inverter in the chain.

It is noted that in the embodiment of FIG. 6, delay logic block 602 is illustrated with three delay circuits. However, in other embodiments, delay logic block may include two delay circuits. In various embodiments, delay logic block may have four or more delay circuits. It is also noted that a single delay circuit may produce two or more delayed signal outputs and may therefore be a suitable embodiment of delay logic block 602.

Sampling circuit 603 may receive delayed clock signal 612a, delayed clock signal 612b, and delayed clock signal 612c and may sample these outputs on the active edges of CLOCK 610. In the embodiment of FIG. 6, three flip-flops, DFF 603a-DFF 603c may be used to sample the three delayed clock signals 612a-612c. Sampling circuit 603 may output the three sampled signals, sampled clock 613a, sampled clock 613b, and sampled clock 613c.

Comparison unit 604 may receive sampled clock 613a, sampled clock 613b, and sampled clock 613c. Comparison unit 604 may also receive sampled derived clock 614. Sampled derived clock 614 may be compared to sampled clock 613a, sampled clock 613b, and sampled clock 613c by comparison unit 604. If all the output signals received by comparison unit 604 are the same value, then CLOCK 610 may be accepted as running at an acceptable frequency. However, if any one of the received outputs is different from the others, then CLOCK 610 may not be running at an acceptable frequency. In other embodiments, all the received outputs being a same logic value, may indicate that CLOCK 610 may not be running at an acceptable frequency.

If comparison unit 604 detects an unacceptable frequency for CLOCK 610, then alert 605 may assert a signal to notify other blocks in the SoC, such as clock management 106 and/or processor 101 from FIG. 1. In some embodiments, alert 605 may force a reset of the SoC. In other embodiments, alert 605 may enable a clock divider circuit to slow the unacceptable CLOCK 610 to an acceptable frequency. Alert 605 may, in some embodiments, be configured such that, once an alert signal is asserted, it cannot be de-asserted except by a system reset. In other embodiments, power may have to be removed from the SoC and then reapplied (also known as a power-on reset or POR) to de-assert the alert signal.

The embodiment illustrated in FIG. 6 is merely one embodiment of a clock monitor circuit. In other embodiments, different numbers of flip-flops and different delay logic circuits may be employed.

Figure 7:
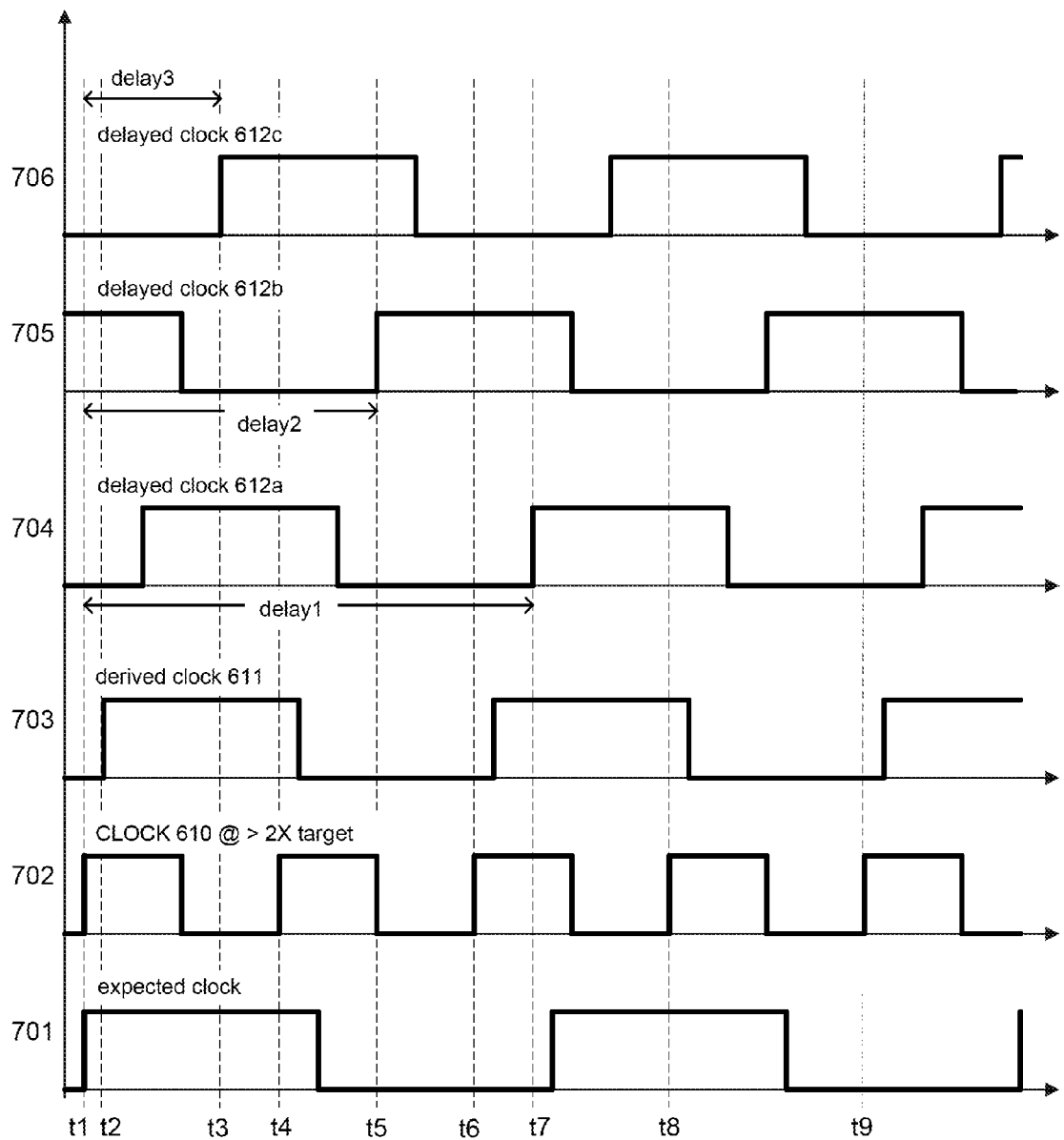
FIG. 7 illustrates possible waveforms corresponding to an embodiment of a clock monitoring system detecting an actual clock source with a frequency greater than expected.

FIG. 7 revisits the case presented in FIG. 5 where the input clock may have a frequency greater than twice the expected frequency. FIG. 7 illustrates possible waveforms which may illustrate the operation of another clock monitor circuit, such as, e.g., clock monitor 600 as illustrated in FIG. 6, when the frequency of CLOCK 610 exceeds twice the expected frequency. Waveform 701 may again show a clock signal running at the expected frequency for reference. CLOCK 610 may be running at more than twice the expected frequency in waveform 702, with rising edges at times t1, t3, t4, t6, and t7. Waveform 703 may represent derived clock 611, with slight delay from t1 to t2 possibly due to propagation delays. Waveform 704 may show delayed clock 612a, with a delay time from time t1 to time t7, similar to waveform 504 from FIG. 5.

Waveform 705 shows delayed clock 612b, which may have a shorter delay than delayed clock 612a with a delay from t1 to t5. In this embodiment, delayed clock 612b may be delayed by approximately two-thirds of the period of the expected frequency. Waveform 706 shows the delayed clock 612c, which may have the shortest delay of the three delayed clocks in the embodiment of FIG. 6 with a delay from t1 to t3. Delayed clock 612c may be delayed by approximately 30% of the period of the expected frequency.

Recall from FIG. 5, the derived clock 211 and delayed clock 212 had the same value at the sample times at the rising edges of CLOCK 210. Notice in FIG. 7, at the sample times at the rising edges of CLOCK 610 (times t1, t4, t6, t8 and t9), that delayed clock 612a and derived clock 611 may have the same value, which may imply an acceptable CLOCK 610. However, looking at waveform 705 and delayed clock 612b, note that delayed clock 612b may have a value opposite of delayed clock 612a and derived clock, waveforms 704 and 703, respectively at times t1, t4, t6, t8 and t9. This opposite value of delayed clock 612b may indicate an unacceptable CLOCK 610 which may result in alert 605 from FIG. 6 asserting an unacceptable CLOCK 610 condition.

It is noted that the waveforms illustrated in FIG. 7 are merely examples. In this example, DFF 601, DFF 603a, DFF 603b, and DFF 603c are illustrated as being active on rising edges of CLOCK 610. In other embodiments, these blocks may be active on falling edges of CLOCK 610, resulting in different waveforms. Actual waveforms from an embodiment of FIG. 6 may also vary due to, for example, the specific circuits used, the technology the circuits are created in, and potential electromagnetic noise within the system.

Figure 8:
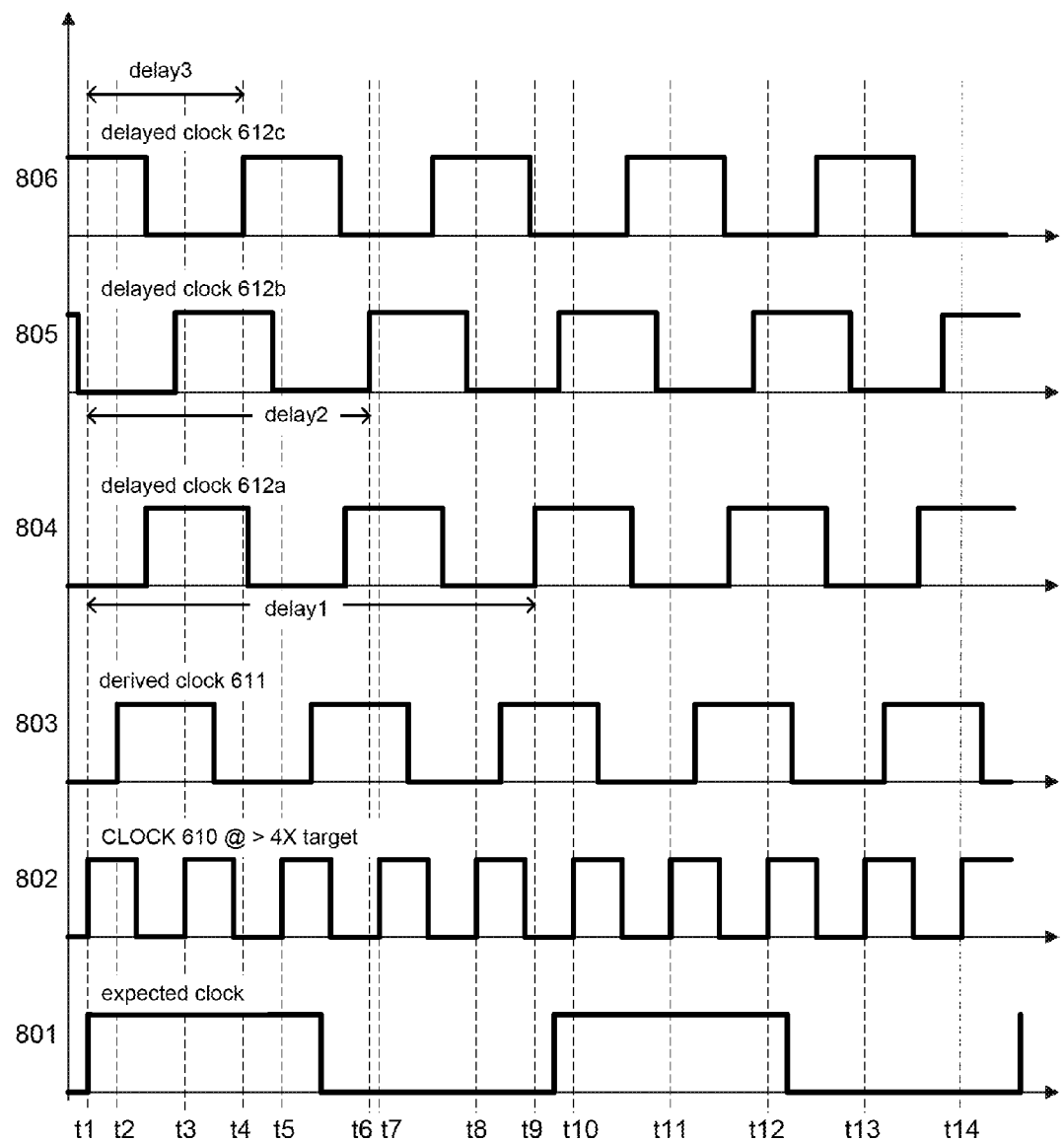
FIG. 8 illustrates possible waveforms corresponding to an embodiment of a clock monitoring system detecting an actual clock source with a frequency greater than expected.

Turning now to FIG. 8, example waveforms that may illustrate the operation of a clock monitor circuit, such as, e.g., clock monitor 600 as illustrated in FIG. 6, are shown. A reference clock signal such as, e.g., CLOCK 610, may be running at a frequency greater than four times the expected frequency, or twice the frequency presented in FIG. 7. Referring collectively to the waveforms of FIG. 8 and the embodiment of FIG. 6, waveform 801 again shows a possible example of a clock signal running at the expected frequency for reference. CLOCK 610 may be running at more than four times the expected frequency in waveform 802, with rising edges at times t1, t3, t5, t7, t8, and t10 -t14 . Waveform 803 may again represent derived clock 611, with a minimal delay from t1 to t2. Waveform 804 shows a possible example of delayed clock 612a, with a delay from t1 to t9. Waveform 805 shows a possible example of delayed clock 612b, with a delay from t1 to t6. Waveform 806 shows a possible example of delayed clock 612c, with a delay from t1 to t4.

In this example, in which CLOCK 610 is greater than four times the expected frequency, note that, at the sample times (times t1, t3, t5, t7, t8, and t10 -t14), delayed clock 612a, delayed clock 612b, and derived clock 611 may have the same value, which again may imply an acceptable CLOCK 610. However, looking at waveform 806 at times t1, t3, t5, t7, t8, and t10 -t14, delayed clock 612c may have a value opposite of delayed clock 612a, delayed clock 612b, and derived clock 611, waveforms 804, 805, and 803, respectively. This opposite value of delayed clock 612c may indicate an unacceptable frequency for CLOCK 610 which may result in alert 605 from FIG. 6 asserting a signal to notify other blocks in the SoC.

As noted above, the waveforms illustrated in FIG. 8 are merely examples. Actual waveforms from an embodiment of FIG. 6 may vary due to, for example, the specific circuits used, the technology the circuits are created in, and potential electromagnetic noise within the system.

Looking back on FIGS. 4, 5, 7, and 8, note that each instance in which the frequency of the clock attack reaches an even numbered harmonic frequency of the expected frequency, a new delay logic block is required. A formula may be applied in order to select appropriate delays for detecting a given range of harmonic frequencies of the expected frequency. To detect the 2Nth to the (2N+1)th harmonic, the delay may need to be in the range, $$\frac{T}{2N} < \text{delay} < \frac{2T}{2N+1} \tag{1}$$

where 'T' is the period of the expected clock frequency and 'N' is the number of the delay block minus one, beginning with the second block.

As an example of calculating delay times for a clock monitoring circuit, such as the embodiment in FIG. 6, assume the expected frequency is 1 Gigahertz (GHz). In other words, the clock monitoring circuit may allow frequencies below 1 GHz and detect frequencies of 1 GHz and above. The first delay block, delay logic block 602a, may have an output that is delayed by a time equal to the period of the expected frequency. In this example, the period of 1 GHz is 1 nanosecond or 1000 picoseconds (ps). Therefore, the delay for delay logic block 602a, delay$_a$, may be set at 1000 ps.

For the second delay time, delay$_b$, from delay logic block 602b, a delay time may be chosen based on Equation 1. The period, T, as previously stated, is 1000 ps. N is the number of the delay block minus one, which in this instance is the second delay block. Therefore N is 2−1=1. From Equation 1, the limits for delay$_b$ are, $$\frac{1000 \text{ ps}}{2 \times 1} < \text{delay}_b < \frac{2 \times 1000 \text{ ps}}{(2 \times 1) + 1} \tag{2}$$

or, $$500 \text{ ps} < \text{delay}_b < 667 \text{ ps} \tag{3}$$

Any value in this range is acceptable, so a value in the middle may be selected, such as, for example, delay$_b$=584 ps.

For the third delay, delay$_c$, from delay logic block 602c, Equation 1 may again be used. The period of the expected frequency, T, does not change, so it is again 1000 ps. For the third delay block, N is 3−1=2. Inserting these values into Equation 1, limits of $$\frac{1000 \text{ ps}}{2 \times 2} < \text{delay}_c < \frac{2 \times 1000 \text{ ps}}{(2 \times 2) + 1} \tag{4}$$

or, $$250 \text{ ps} < \text{delay}_c < 400 \text{ ps} \tag{5}$$

are determined for delay$_c$. Since a value in the middle was selected for delay$_b$, a value in the middle for delay$_c$ may be selected again to avoid gaps in coverage. Therefore, delay$_c$=325 ps may be the best selection.

Since this example used three delay logic blocks and used Equation 1 for the second and third delay calculations, the embodiment of FIG. 6 may be capable of detecting clock frequencies from the expected frequency up to and including 2N+1 harmonics. Since N=2 for three delay logic blocks, this would be the 5th harmonic. This example used an expected frequency of 1 GHz, meaning the embodiment as shown in FIG. 6 with the selected delays of 1000 ps, 584 ps, and 325 ps may detect frequencies up to at least 5 GHz.

It is noted that flip-flops and other logic circuits may have delays associated with their operation. Therefore, the calculated delays from Equation 1 may have to be adjusted slightly to account for any delays introduced by logic circuits such as, for example, DFF 601 or sampling circuit 603. It is also noted that the timing of electronic circuits may vary due to changes in the temperature of the circuits, the voltage(s) within the circuits, and processing variations during the manufacturing of the circuits. It is further noted that timing in circuits, including delay circuits, may be adjusted to compensate for these variations to add an operating margin. Therefore actual delay values used in a given clock monitor circuit, such as, e.g., clock monitor 600, may not be exactly equal to the values calculated in the above example delay calculations. Using the calculated delay values as a baseline, the actual delay values may be "substantially close to" or "substantially equal to" the calculated values, to allow for operating margin added to account for the aforementioned sources of circuit variation.

Figure 9:
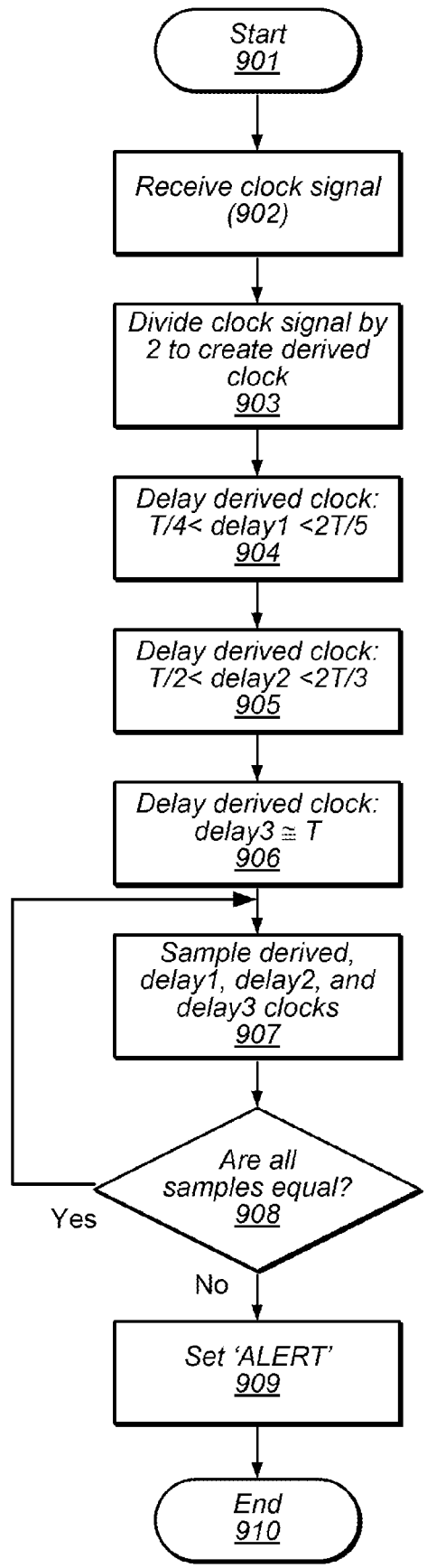
FIG. 9 illustrates an embodiment of a method for monitoring a clock signal.

A method corresponding to the embodiment of the clock monitor of FIG. 6 is shown in FIG. 9. The method begins in block 901. A clock signal may be received from a clock source (block 902). The clock signal may have an expected maximum frequency.

The frequency of the received clock signal may be divided by two and the divided clock signal may be referred to as a derived clock signal (block 903). In other embodiments, the frequency may be divided by more than two. The rising and falling edges of the derived clock signal may approximately align with the rising edges of the received clock signal. In other embodiments, the rising and falling edges of the derived clock signal may approximately align with the falling edges of the received clock signal.

The derived clock signal may enter a first delay block wherein the output is equivalent to the derived clock signal delayed by a first delay (block 904). The first delay may be set to a value between ¼ of the period of the expected maximum frequency and ⅖ of the period of the expected maximum frequency.

The derived clock signal may enter a second delay block wherein the output is equivalent to the derived clock signal delayed by a second delay (block 905). The second delay may be set to a value between ½ of the period of the expected maximum frequency and ⅔ of the period of the expected maximum frequency.

The derived clock signal may enter a third delay block wherein the output is equivalent to the derived clock signal delayed by a third delay (block 906). The third delay may be equal to the period of the expected maximum frequency. In some embodiments, the third delay may be shorter than the period of the expected maximum frequency. In other embodiments, the third delay may be longer than the period of the expected maximum frequency.

The derived clock signal, the first delayed clock signal, the second delayed clock signal, and the third delayed clock signal may be sampled (block 907). In some embodiments, the sampling of these clock signals may occur on the rising edge of the received clock signal. In other embodiments, these clock signals may be sampled on the falling edge of the received clock signal.

The samples of the derived clock signal and the first, second and third delayed clock signals may be compared to determine if they all have an equal value (block 908). In some embodiments, if these sampled clock signals all have an equal value, the received clock signal may be considered to be running at an acceptable frequency and the method may return to block 907 where a next period of the clock signals may be sampled. If the sampled clock signals do not all have an equal value, the method may move to block 909. In other embodiments, the sampled clock samples may be configured such that if the clock signals all have an equal value, the received clock signal may not be considered acceptable and the method may move to block 909.

Block 909 may be entered if the received clock signal is determined to be running at an unacceptable frequency, in which case an alert signal may be asserted and the method may end in block 910. In some embodiments, the alert signal may be de-asserted only by a system reset. In alternate embodiments, the alert signal may only be de-asserted by cycling the system power on and off. In other embodiments, the received clock signal may continue to be monitored and the alert signal may be de-asserted if the reference clock signal is subsequently determined to be running at an acceptable frequency.

It is noted that in various embodiments, the blocks presented in the method of FIG. 9 may be executed in a different order and some blocks may be executed in parallel. For example, in some embodiments, the three delay blocks, 904, 905, and 906 may receive the derived clock in parallel.

Figure 10:
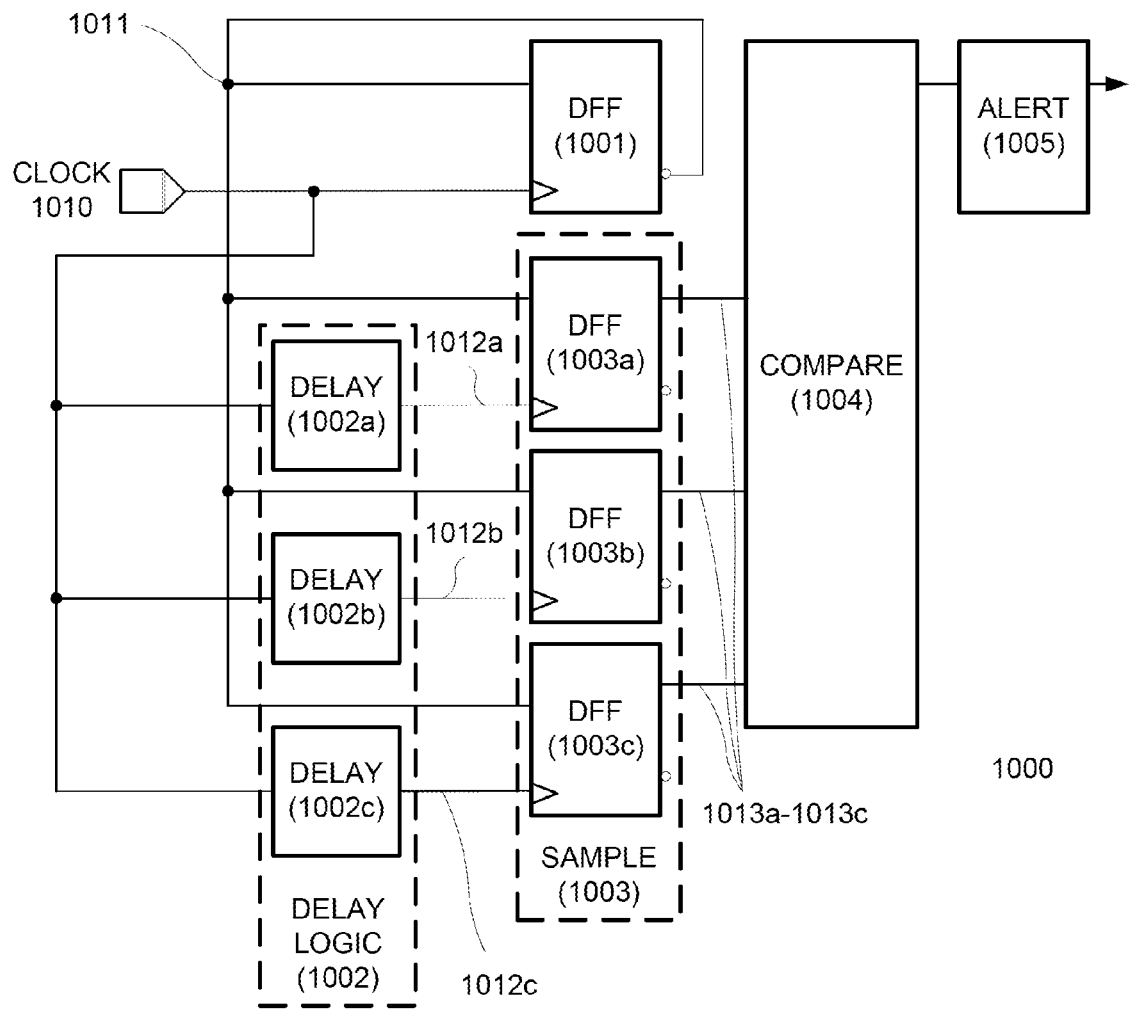
FIG. 10 illustrates a block diagram an alternate embodiment of a clock monitoring system.

Turning to FIG. 10, an alternate embodiment of a clock monitor is illustrated. This alternate embodiment of a clock monitor may include of similar blocks as the embodiment of FIG. 6. Clock monitor 1000 includes DFF 1001, delay logic block 1002, sampling circuit 1003 coupled to delay logic 1002 and DFF 1001, comparison circuit 1004 coupled to DFF 1001 and sampling circuit 1003, and alert 1005 coupled to comparison circuit 1004.

In this alternate embodiment, DFF 1001 may be configured similar to DFF 601 from FIG. 6. DFF 1001 may receive a reference clock signal, CLOCK 1010, to be monitored. The frequency of CLOCK 1010 may be divided by two by DFF 1001 to create derived clock 1011. In some embodiments, the rising and falling edges of derived clock 1011 may occur after a slight propagation delay from the rising edges of the CLOCK 1010. In other embodiments, the edges of the derived clock signal may occur after a slight propagation delay from the falling edges of CLOCK 1010.

Delay logic block 1002 may receive CLOCK 1010, in some embodiments. Delay logic block 1002 may include a plurality of delay circuits. In the present embodiment, three delay circuits are illustrated, delay 1002a, delay 1002b, and delay 1002c. CLOCK 1010 may be delayed by three different delay times, selected as described previously. In various embodiments, delay logic block 1002 may include two or more delay circuits. The outputs of delay 1002a, delay 1002b, and delay 1002c are delayed clock 1012a, delayed clock 1012b and delayed clock 1012c, respectively.

It is noted that FIG. 10 illustrates delay logic blocks delay 1002a, delay 1002b, and delay 1002c as being arranged in parallel, with each of the delay logic blocks receiving CLOCK 1010. In alternate embodiments, delay 1002a, delay 1002b, and delay 1002c may be arranged in series, with the delay logic block that outputs the shortest delayed clock being first in the series and the delay logic block that outputs the longest delayed clock being last in the series.

In some embodiments, sampling circuit 1003 may receive delayed clock 1012a, delayed clock 1012b and delayed clock 1012c as well as derived clock 1011. In the embodiment of FIG. 6, the derived clock and the delayed clocks may be sampled on a rising or falling edge of CLOCK 1010. In the alternate embodiment of FIG. 10, the derived clock signal may be sampled at each rising or falling edge of the three delayed clocks. These sampled values may be output from sampling circuit 1003 as sampled clock 1013a, sampled clock 1013b, and sampled clock 1013c.

Compare circuit 1004 may receive sampled clock 1013a, sampled clock 1013b, and sampled clock 1013c in this alternate embodiment. Refer back to the waveforms of FIG. 8 in which a CLOCK 1010 signal may be running at four times the expected clock frequency. Looking at waveforms 803-806, we can see that at the rising edges of delayed clock 1012a (time t9) and delayed clock 1012b (time t6), the derived clock may be high, but at the rising edge of delayed clock 1012c (time t4), derived clock may be low. If CLOCK 1010 were running at the expected frequency, we might expect all samples to be the same value. Therefore, compare circuit 1004 may consider the opposite value of the delayed clock 1012c sample as an indication of an unacceptable CLOCK 1010 frequency.

In some embodiments, if compare circuit 1004 detects an unacceptable CLOCK 1010 frequency, then alert 1005 may assert a signal to notify other blocks in the SoC, such as clock management 106 and/or processor 101 from FIG. 1. In some embodiments, alert 1005 may force a reset of the SoC. In other embodiments, alert 1005 may enable a clock divider circuit to slow the unacceptable CLOCK 1010 to an acceptable frequency. Alert 1005 may, in some embodiments, be configured such that, once an alert signal is asserted, it cannot be de-asserted except by a system reset. In other embodiments, a power-on reset may have to occur to de-assert the alert signal.

The embodiment illustrated in FIG. 10 is merely one embodiment of a clock monitor circuit. As shown, various embodiments are possible. In other embodiments, different numbers of flip-flops and different delay logic circuits may be employed. Logic circuits may be designed to operate in response to rising or to falling or to both edges of the various clock signals described herein.

Numerous variations and modifications will become apparent to those skilled in the art once the above disclosure is fully appreciated. It is intended that the following claims be interpreted to embrace all such variations and modifications.

What is claimed is:

1. A system, comprising:
   a processor;
   a memory coupled to the processor, wherein the memory is configured to store program instructions;
   a reference clock circuit coupled to the processor, wherein the reference clock circuit is configured to generate a reference clock signal, and wherein the reference clock signal has an expected maximum frequency; and
   a clock monitor circuit coupled to the processor and to the reference clock circuit, wherein the clock monitor circuit is configured to:
      receive the reference clock signal;
      create a derived clock signal dependent upon the reference clock signal, wherein a frequency of the derived clock signal is lower than a frequency of the reference clock signal;
      create a plurality of delayed clock signals, dependent upon the derived clock signal, wherein a frequency of each delayed clock signal of the plurality of delayed clock signals is the same as the frequency of the derived clock signal, and wherein each of the plurality of delayed clock signals is delayed by a respective one of a plurality of delay times;
      sample the derived clock signal and each delayed clock signal of the plurality of delayed clock signals in response to an active edge of the reference clock signal;
      compare the sample of the derived clock signal and each sample of the plurality of delayed clock signals;
      determine, dependent upon the comparison of the samples of the derived clocks signal and each sample of the plurality of delayed clock signals, if the frequency of the reference clock signal is greater than the expected maximum frequency; and
      assert an alert signal, dependent upon the determination the frequency of the reference clock is greater than the expected maximum frequency.

2. The system of claim 1, wherein the clock monitor circuit is further configured to delay an initial one of the plurality of delayed clock signals by an amount of time substantially equal to the period of the expected maximum frequency.

3. The system of claim 2, wherein the clock monitor circuit is further configured to delay remaining delayed clock signals of the plurality of delayed clock signals by an amount of time greater than the period of an even harmonic of the expected maximum frequency and less than one-half of the period of the next larger odd harmonic of the expected maximum frequency.

4. The system of claim 1, wherein the clock monitor circuit is further configured to reset the system in response to determining the actual frequency of the reference clock signal is greater than the expected maximum frequency.

5. The system of claim 1, wherein the clock monitor circuit is further configured to reduce the frequency of the reference clock signal in response to the determination the actual frequency of the reference clock signal is greater than the expected maximum frequency.

6. The system of claim 1, wherein the clock monitor circuit is further configured to sample each delayed clock signal of the plurality of delayed clock signals in response to a rising edge of the reference clock signal.

7. The system of claim 1, wherein the clock monitor circuit is further configured to sample each delayed clock signal of the plurality of delayed clock signals in response to a falling edge of the reference clock signal.

8. A method for monitoring a reference clock signal of a computing system, comprising:
   generating a derived clock signal with a frequency one-half of the reference clock signal;
   generating a first delayed clock signal dependent upon the derived clock signal, wherein the first delayed clock signal is delayed from the derived clock signal by a period corresponding to an expected maximum frequency of the reference clock signal;
   generating a second delayed clock signal dependent upon the derived clock signal, wherein the second delayed clock signal is delayed from the derived clock signal by an amount of time greater than the period of an even harmonic of the expected maximum frequency and less than one-half of the period of the next larger odd harmonic of the expected maximum frequency;
   sampling the plurality of delayed clock signals to generate a respective plurality of clock samples;

comparing each clock sample of the plurality of clock samples to the derived clock signal;

determining, dependent upon the comparisons, if the actual frequency of the reference clock signal is greater than the expected maximum frequency; and generating an alert signal if the actual frequency is greater than the expected maximum frequency.

9. The method of claim 8, wherein generating the first delayed clock signal is dependent upon the second delayed clock signal.

10. The method of claim 8, further comprising generating a third delayed clock signals.

11. The method of claim 8, further comprising resetting the computing system dependent upon the generated alert signal.

12. The method of claim 8, further comprising, in response to the determination the frequency of the reference clock signal is greater than the expected maximum frequency, reducing the frequency of the reference clock signal.

13. The method of claim 8, wherein sampling the plurality of delayed clock signals comprises sampling the plurality of delayed clock signals in response to a rising edge of the reference clock signal.

14. The method of claim 8, wherein sampling the plurality of delayed clock signals comprises sampling the plurality of delayed clock signals in response to a falling edge of the clock signal.

15. An apparatus, comprising:
a reference clock circuit configured to generate a reference clock signal, wherein the reference clock signal has an expected minimum period;
a frequency divider circuit coupled to the reference clock circuit, wherein the frequency divider is configured to generate a derived clock signal, wherein a period of the derived clock signal is greater than a period of the reference clock signal;
a delay unit coupled to the frequency divider, wherein the delay unit is configured to:
generate a first delayed clock signal from the derived clock signal, wherein the first delayed clock signal is delayed by the expected minimum period of the reference clock;
generate a second delayed clock signal from the derived clock signal, wherein the second delayed clock signal is delayed by an amount of time greater than an even harmonic of a frequency whose period is the expected minimum period and less than one-half of the next larger odd harmonic of the frequency whose period is the expected minimum period;
a sampling unit coupled to the delay unit and coupled to the reference clock circuit, wherein the sampling unit is configured to sample and store, for one reference clock period, the first delayed clock signal and the second delayed clock signal and output each of the stored sample signals; and
a comparison unit coupled to the sampling unit, wherein the comparison unit is configured to:
receive the stored sample signals and the derived clock signal;
compare the stored sample signals to the derived clock signal;
determine if the actual period of the reference clock signal is less than the expected minimum period; and
assert an alert signal responsive to a determination the period of the reference clock signal is less than the expected minimum period.

16. The apparatus of claim 15, wherein to generate the first delayed clock signal, the delay unit is further configured to generate the first delayed clocks signal dependent upon the second delayed clock signal.

17. The apparatus of claim 15, wherein the delay unit includes a plurality of serially connected inverters.

18. The apparatus of claim 15, wherein the comparison unit is further configured to reduce the frequency of the reference clock signal in response to determining the actual frequency of the reference clock signal is greater than the expected maximum frequency.

19. The apparatus of claim 15, wherein to sample the first delayed clock signal and the second delayed clock signal, the sampling unit is further configured to sample the first delayed clock signal and the second delayed clock signal in response to a rising edge of the reference clock signal.

20. The apparatus of claim 15, wherein to sample the first delayed clock signal and the second delayed clock signal the sampling unit is further configured to sample the first delayed clock signal and the second delayed clock signal in response to a falling edge of the reference clock signal.

* * * * *